Nov. 16, 1943.    A. C. FISCHER    2,334,184
LAMINATED EXPANSION JOINT
Filed Aug. 23, 1941
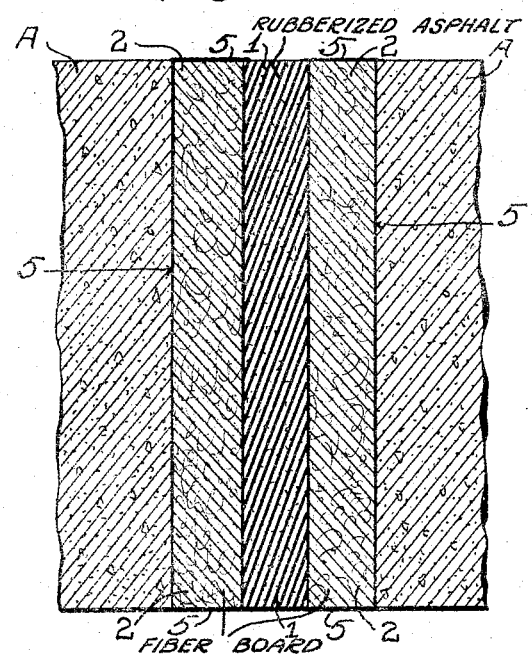
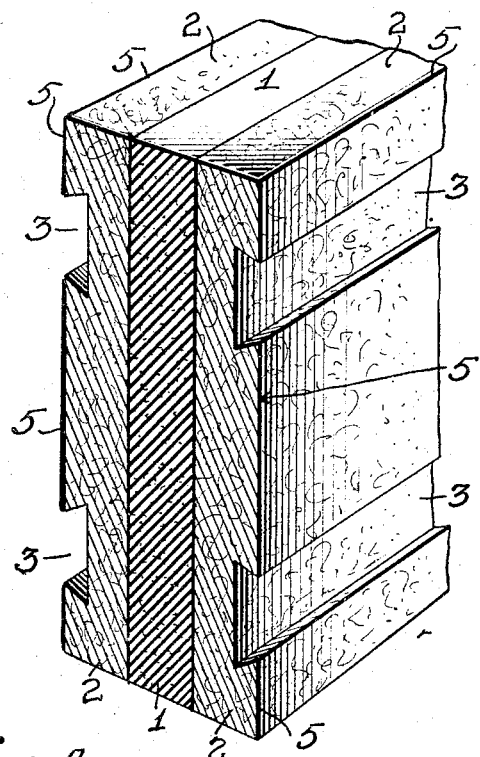
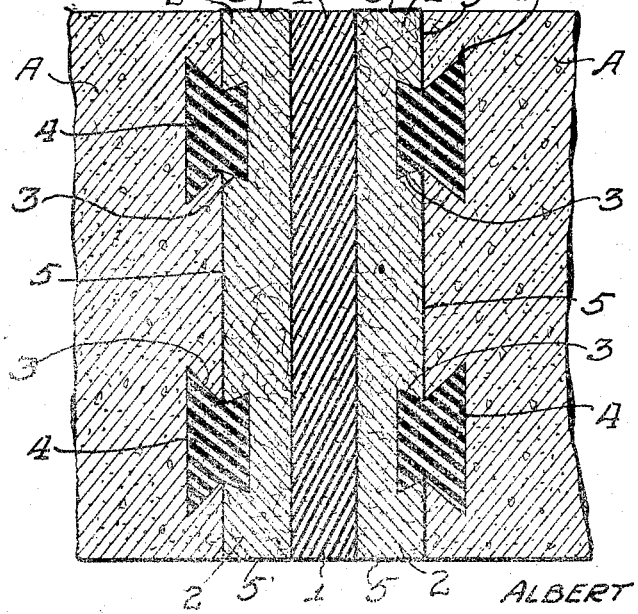
Inventor;
ALBERT C. FISCHER,
By Knight Bros
Attorneys.

Patented Nov. 16, 1943

2,334,184

UNITED STATES PATENT OFFICE 2,334,184

LAMINATED EXPANSION JOINT

Albert C. Fischer, Chicago, Ill.

Application August 23, 1941, Serial No. 408,083

12 Claims. (Cl. 94—18)

This invention relates to packings for expansion joints for use in filling and waterproofing spaces left for expansion and contraction of meeting members of masonry structures and particularly composite packings comprising an assembly of laminae made of different materials; for instance a slab-like lamina of plastic material adapted to serve as a core for the joint packing and having the capacity of sluggishly flowing at atmospheric temperatures and sealing the space which it occupies against entry of moisture; and a lamina or laminae of fibrous material (for instance) serving as side boards for the core of the packing uniting with said core to form a substantially integral packing structure to which it lends the physical property of compressibility and preferably resiliency as well in order that the packing will fill the expansion space, not withstanding changes in the dimension of the space due to expansion and contraction of the masonry members.

This application is a continuation-in-part of my co-pending application Serial No. 260,443, filed March 7, 1939, Patent No. 2,253,513, August 26, 1941.

In my Patent No. 2,253,513, issued August 26, 1941, I have disclosed a laminated expansion joint member comprising an intermediate slab of bituminous or other cold flow plastic material preferably of a formula bestowing upon said slab a degree of plasticity that will render the slab form-retaining and non-collapsible during transportation of the laminated packing as well as under manipulation incident to installation; there being combined with said plastic slab a lamina or two laminae overlying one or both of the outer lateral faces of said slab and formed of fiber, but saturated or filled with a solvent of the material of the slab and in such contiguous relation to the slab that it will transfer its solvent filler to the slab through the process of absorption especially when the whole laminated member is under pressure of expanding masonry sections, and by such transfer, charge the slab with the solvent and render it more freely deformable. But in such patented expansion joint, the vehicular laminae did not afford the inherent compressibility and resiliency desirable under some circumstances and particularly did not afford a degree of controlled compressibility that provided for restriction of cold flow of the core and avoidance of waste.

The invention of the present application employs as the instrumentalities of its realization, a lamina in the nature of a mastic core and laminae in the relation of side boards housing said core; also adjunctive devices in the form of wings that, in the installation of the joint, became enveloped in and anchored to the cement members of the masonry; for which reason the present application is a continuation in part of my said Letters Patent.

But, in the present application, the side boards or housing members of the core unite with the core to form a substantially integral expansion joint packing structure; said boards are without filling in their pores and are highly compressible and possess a substantial degree of resiliency; safeguard the core against excessive and wasteful cold flow by absorbing predetermined proportions of expansion movement of the masonry members, and withal afford an entirely different operative principle from that identifying the oil filled fiber boards.

Thus the present invention employs two sheets of fiber board, preferably waterproofed by a surface jacket of non-permeating and non-dissipating material, housing a strip of asphalt, asphalt and fiber composition, asphalt and rubber composition, asphalt, rubber and fiber composition, asphalt, rubber, fiber and mineral composition, asphalt and mineral composition or asphalt, mineral and fiber composition. The fiber board is of a dimension thicker than commercial saturated felt. Preferably the fiber board is from $\frac{1}{16}$" to thicknesses in excess of $\frac{1}{2}$". The fiber board and its waterproofing coat has considerable resiliency so that the coating will not crack and the board as well as the waterproofing material may re-expand after compression. The fiber board will have inherent resiliency and under pressure will not be subject to spreading. The mastic core may be of various compositions as described and under considerable pressure built up by resistance of the fiber-board will be subject to cold flow. A suitable formula for this material will comprise approximately 70% to 75% bituminous matter, 8% to 12% fibrous matter and from 13% to 22% mineral matter. However, this composition may be modified by increasing or decreasing the mineral or fibrous material. Where a softer bituminous material is utilized, then vegetable or mineral fiber may be utilized and various types of asphalt may be used as the binding material. The mineral matter of course will be such substances as limestone dust, diatomaceous earth, fuller's earth, clay, silica, calcium carbonate, etc. Almost any fiber board of the insulating type may be utilized provided it is substantially non-flexible.

Where this material has heretofore been used for expansion joint purposes, it has compensated thermal expansion of the cement sections and reduction of size of the expansion chamber partly by cold-flow of the plastic slab and partly by inherent compressibility of the laminated structure as a whole, refilling of the chamber in response to contraction of the cement sections being caused by counterflow of the plastic and re-expansion of the laminated structure as a whole, superinduced by anchorage of the two outer laminae of fiber to the cement sections that caused the void; and it was preferred in the said hitherto uses, that the fiber board lamina or laminae contained an oily content solvent of the plastic that was imparted by absorption to the composition core to raise deformability of the latter.

According to the present improvement, in continuation of the former embodiment, the oily content is omitted from the fiber sides; cold flow of the plastic is limited to that needed for mushroom seal of the crack between the pavement sections, elasticity of the fiber board is mainly depended upon for keeping the expansion chamber filled; and the pores of the fibrous laminae are left unfilled, although preferably jacketed by an impenetrable and non-permeating coat that enables the fiber laminae to act with a higher degree of resiliency and occupy a greater portion of space than the oil saturated fiber boards formerly used. To illustrate, most fiber boards, when compressed to 50% of their thickness, will, when relieved of pressure, re-expand from 70% to 90% of their initial thickness, depending upon the nature of the waterproofing applied to the lamina; and there is even less range of compressibility or elasticity in thin layers of felt or where felts have been saturated with asphalt compound. Restriction of cold flow of the plastic lamina to that required for mushroom-sealing at the road surface is caused partly by formula determining degree of plasticity of the core lamina and partly by the compressibility of the impregnated fiber laminae.

In the accompanying drawing two illustrative embodiments are shown in vertical transverse section: Figure 1 showing a simple form and Figures 2 and 3 showing two stages of a form in which the two unimpregnated fiber laminae are anchored to the cement sections. 1 represents the asphalt or bituminous core and 2 the fiber board sides with unfilled pores; substantially inflexible but highly compressible. The core has sufficient plasticity to flow or deform at atmospheric temperatures, under pressures built up by movement of the pavement sections opposed by the unfilled fiber laminae and dimensions are selected to cause exuding sufficient for mushroom-sealing of the crack, but not sufficient to cause excess of plastic to exude and be carried away by traffic and leave the crack exposed to infiltration. Resiliency of fiber laminae being depended upon so largely for reaction during temperature contraction, enough bituminous material to seal the crown and aid in its waterproofing of the joint can be assured without a free flow tending to waste. Use for expansion joint purposes, of fiber by itself would, because of brittleness, cause breaks in handling. But, by fastening a fiber lamina face to face to a bituminous core, the laminae become intersustaining and unite in a substantially integral structure. The plastic corrects brittleness of the fiber; the fiber checks deformation of the plastic; and compressibility of the fiber laminae relieves the plastic from dissipation by excessive pressure; formation of surface bumps by excessive exuding does not occur; greater assurance of refill of the expansion chamber under masonry contraction is assured and an altogether more economical practice is provided.

The modification shown in Figures 2 and 3 differs from the form shown in Figure 1, in that the fiber board sides 2 are constructed with seating channels 3 for the reception of anchoring ribs 4 presented by said sides in positions to become embedded in masonry poured against the sides where said ribs effectively seal the joint against infiltration of moisture, sand, dirt and especially if said ribs be made, as is preferred, of sponge rubber, cork, cork rubber, asphaltic minerals, raw rubber or any resilient composition. These ribs 4 are fixedly mounted in channels 3 by proper cementitious matter or other suitable fastening means and being preferably embedded in both the fiber board laminae and the cement and being highly flexible and resilient will resist shearing under vertical relative movements of the cement sections or rupture under excessive tension or compression, or other impairment. They can impart tension to the fiber boards, and assist re-expansion of the joint and maintain the hermetic character of the seal which they afford even though distended by excessive temperature contraction. This arrangement without losing the hermetic character of its waterstop will admit of a 50% to 75% compression of the expansion joint and a re-expansion to a thickness that is 100%, 110% or even 115% of the initial dimension.

In embodying the present invention in practical form, the plastic core plate may be of various materials such for instance as various types of asphaltic material, rubber-asphalt or rubber with or without fiber and other filling ingredients lending resiliency to the mass. One suitable material which can be used for the core of the present invention is the contraction material described and covered by my Patent No. 1,952,706, issued March 27, 1934, except that the material need not necessarily be an emulsion. It may comprise any of the plastic asphalts known to the trade, or it may be made of any vegetable oil polymerized or otherwise, or it may be an asphalt containing a polymerized oil.

In the drawing, the coatings for the fiber board laminae 2, are indicated by the heavy lines 5. These coatings are of a nature that avoids permeation of the fibrous bodies, or any substantial detraction from its compressibility, thus leaving the latter free to compress and re-expand. Said coatings will follow the surface of the fibrous body in conforming to the masonry sections without cracking of the coatings; and they are impervious to moisture.

The strips or ribs 4, embedded in the masonry, constitute waterstop wings. Being resilient they do not rupture under tension, compression or shear or lose their hermetic bearings when deformed by such forces. Being inherently compressible they will yield to excessive tension by movement in the cement matrices in which they are embedded.

The fiber board may be any commercial inflexible, unfilled but compressible insulation board of substantial thickness such as maize-wood, Celotex, Fir-Tex, Gypsum Board, Masonite, etc. Or it may be made of digested fibers of wood, or of cornstalks, cane fiber or even mineral fibers such as mineral wood or fiberized glass.

I claim:

1. A laminated expansion joint packing for paving and other masonry structures, said packing comprising a first lamina of non-brittle cold flowing plastic material, constituting a core of the packing and a second lamina constituting a form retaining side board for said core; said second lamina being constructed of fibrous material felted into a porous body having form retaining integrity and of a thickness comparable to that of said first lamina; the internal pores of said second lamina being open, free from filling material and leaving the lamina compressible; said second lamina having its constituent fibers free from interadhesion at their intersections in the mass and leaving said mass with a high range of compressibility but low degree of flexibility in a direction perpendicular to the plane of the laminae; said plastic and fibrous laminae being united face to face in mutually sustaining relation to each other and jointly constituting a substantially integral board-like structure to which they respectively contribute on the one hand non-frangibility and on the other hand compressibility and maintenance of board-like form.

2. A laminated expansion joint packing according to claim 1 in which they are two laminae of fibrous material applied and functioning as described to the respective faces of the plastic lamina.

3. A laminated expansion joint packing as described in claim 1 in which the lamina of fibrous material is provided with an internal waterproofing jacket of impervious, non-permeating material.

4. A laminated expansion joint packing as described in claim 1 in which the lamina of fibrous material is provided with an internal waterproofing jacket of impervious, non-permeating material and said lamina of fibrous material is provided upon its face that meets the masonry in use, with a waterstop wing of compressible material that becomes embedded in the masonry when the latter is poured against said lamina of fibrous material.

5. An expansion joint packing as described in claim 1 in which the first lamina is formed of rubberized asphaltic material and the second lamina is a substantially inflexible but compressible board united throughout its flat face to the asphaltic lamina.

6. A waterstop expansion joint for yieldingly filling and for waterproofing the space between sections of poured masonry, said expansion joint comprising a compressible and expansible core unit composed at least in part of compressible and distendable fiber board adapted to close an expansion space and a pair of outwardly flared projections of resilient and compressible material mounted upon opposite sides of the core unit in positions to be embedded in the sections of masonry poured against the core unit, and to be thereby caused to partake of relative movements of the sections toward and away from each other; said projections standing in hermetic and tension sustaining union respectively with opposite faces of the core unit that causes the core unit to not only receive loads of compression through the projections but to partake of movements of retraction developed in the projections by the masonry sections and thereby cause the projections and the portion of the core unit between them to be spread as an apron across spaces that may open between the masonry sections and the core unit and to withstand effectively shearing stresses in a direction transverse to the plane of the apron.

7. A waterstop expansion joint for yieldingly filling and for waterproofing the space between sections of poured masonry, said expansion joint comprising a compressible and expansible core unit composed of cold-flow plastic material and sheets of fiber board on the opposite sides thereof adapted to close an expansion space, a pair of outwardly flared projections of resilient compressible material partly embedded in said sheets of fiber board on opposite sides of said core unit in positions to be embedded in the sections of masonry poured against the core unit, and to be thereby caused to partake of relative movements of the sections toward and away from each other; said projections standing in hermetic and tension sustaining union respectively with opposite faces of the core unit that causes the core unit to not only receive loads of compression through the projections but to partake of movements of retraction developed in the projections by the masonry sections and thereby cause the projections and the portion of the core unit between them to be spread as an apron across spaces that may open between the masonry sections and the core unit and to withstand effectively shearing stresses in a direction transverse to the plane of the apron.

8. Laminated packing for structural members, said packing comprising a layer of deformable waterproof material of substantial thickness forming a core for the packing and alternated therewith, resiliently compressible protective material also in the form of a layer having a thickness comparable to that of the core; said protective material comprising a body of inherently resilient fibers in matted form and having pores defined by its constituent fibers; said fibers being non-adhering and readily movable one upon another and leaving the body freely deformable under compression and its pores freely penetrable and having the capacity to absorb a substantial proportion of the pressure imposed upon the packing when in use and thereby reduce displacement of the material of the deformable core.

9. Laminated packing as described in claim 8, in which the body of resiliently compressible protective material is in two layers on opposite outer faces of the layer that forms the core; the core is adhered to the porous surfaces of the bodies of protective material substantially throughout their meeting faces; waterproofing is applied to the faces of the protective bodies that are remote from the core and said protective layers are strengthened by the core, against fracture in manipulation.

10. A laminated packing for structural members, said packing comprising a core layer of flowable material of substantial thickness and a pair of porous protective layers applied to the faces of said core having a thickness comparable to that of the core; said protective layers having their pores free and unobstructed and leaving said protective layers highly compressible.

11. A laminated packing for structural members comprising a pair of protecting layers and an intervening layer of flowable material between said protecting layers; said protecting layers being structurally highly porous, having its pores unobstructed and being resiliently compressible and said core being adhered to and imparting physical strength to said protecting layers.

12. A packing as described in claim 11 in which exposed surfaces of the protecting layers are waterproofed but have their pores left unobstructed.

ALBERT C. FISCHER.